United States Patent
Hawkins

[19]

[11] Patent Number: 6,058,632

[45] Date of Patent: May 9, 2000

[54] TOOL HOLDER WITH PERCUSSION MEMBER

[76] Inventor: Peter Arthur Taylor Hawkins, Unit 7, Station Road Industrial Estate, Wallingford, Oxon, OX10 0HX, United Kingdom

[21] Appl. No.: 08/965,808

[22] Filed: Nov. 7, 1997

[51] Int. Cl.[7] .................................................. E04G 23/08
[52] U.S. Cl. .............................................. 37/406; 37/904
[58] Field of Search .............................. 37/406, 403, 904

[56] References Cited

U.S. PATENT DOCUMENTS

| | | | |
|---|---|---|---|
| 2,870,925 | 1/1959 | Bernad et al. ................. | 37/406 X |
| 3,322,210 | 5/1967 | Arndt et al. . | |
| 4,244,092 | 1/1981 | Riddles ......................... | 29/252 |
| 4,410,145 | 10/1983 | Koch ............................ | 241/264 |
| 4,508,017 | 4/1985 | Montabert ..................... | 92/85 B |
| 4,536,976 | 8/1985 | Holopainen ................... | 37/406 |
| 4,646,854 | 3/1987 | Arndt et al. ................... | 173/134 |
| 4,650,008 | 3/1987 | Simson ......................... | 173/91 |
| 5,038,668 | 8/1991 | Arndt et al. ................... | 91/290 |
| 5,062,227 | 11/1991 | De Gier et al. ................ | 37/403 |
| 5,273,217 | 12/1993 | Bartels et al. ................. | 241/30 |
| 5,472,308 | 12/1995 | Somero ......................... | 37/406 X |

FOREIGN PATENT DOCUMENTS

| | | |
|---|---|---|
| 2115115 | 9/1994 | Canada . |
| 24748 | 3/1981 | European Pat. Off. . |
| 071546 | 2/1983 | European Pat. Off. . |
| 0191336 | 8/1986 | European Pat. Off. . |
| 271359 | 6/1988 | European Pat. Off. . |
| 0384057 | 8/1990 | European Pat. Off. . |
| 404229 | 12/1990 | European Pat. Off. . |
| 440188 | 8/1991 | European Pat. Off. . |
| 2024501 | 12/1971 | Germany . |
| 2621043 | 12/1976 | Germany . |
| 3207559 | 9/1983 | Germany . |
| 524662 | 8/1976 | U.S.S.R. . |
| 1307188 | 2/1973 | United Kingdom . |
| 1475844 | 6/1977 | United Kingdom . |
| 1584810 | 2/1981 | United Kingdom . |
| 2203675 | 10/1988 | United Kingdom . |
| 9010501 | 9/1990 | WIPO . |
| 9115296 | 10/1991 | WIPO . |
| 9527111 | 10/1995 | WIPO . |
| 9602324 | 2/1996 | WIPO . |

OTHER PUBLICATIONS

Krupp Hydraulic Hammer HM50 Published by Krupp Industrietechnik (Believed—Actual Publn. Date Unknown) 1985 (Spare Parts List–Operating Instructures).

*Primary Examiner*—Christopher J. Novosad
*Attorney, Agent, or Firm*—Robert W.J. Usher.

[57] ABSTRACT

Apparatus for performing work by advancing a tool against a resistance thereto, and in particular, an excavator attachment or a rock concrete or engine crusher in which a pivoted jaw member (16) is advanced by a hydraulic ram (30) against a fixed plate (22) includes percussion device in the form of a hydraulic hammer acting against a fixed anvil (46,50) to assist the ram. Hydraulic fluid can be diverted from the ram to the hammer as required.

13 Claims, 7 Drawing Sheets

TOOL HOLDER WITH PERCUSSION MEMBER

This invention relates to doing work with a tool, and in particular to apparatus and methods therefor.

The invention specifically concerns itself with the performance of any kind of work in which a tool in a broad sense is advanced against a resistive force and needs to overcome the resistive force in order to achieve the work. Examples of such operations include, but are not limited to, the demolition of structures, such as buildings and roadways; the breaking and crushing of rocks, concrete both plain and reinforced, and scrap metal, such as car bodies and metal castings; excavation and earth moving; and lifting and the use of jacks for other purposes.

The invention is concerned with the use of tools in contexts such as these where normally a steady or persistent force is applied by an actuator of some kind to overcome a resistive force and advance the tool. It can be seen from the foregoing examples that the tool in question can be of different kinds including the working regions of demolition grapples, crushing jaws and digging implements, and other workpiece-engaging tool elements.

It will be recognised that the magnitude of the resistive force opposing any tool is likely to vary, not only from one job to another, but also within a given job, for example the crushing and compacting of scrap metal.

The goal of maximising the effectiveness of a tool is accommodated in tool design in various ways, including the choice of geometry of the tool, and the selection of the actuator, and the use of a sufficiently robust structure to handle the result.

This invention seeks to provide a novel technique for working with a tool against resistance, which will supplement and enhance the benefits of good mechanical design and the actuator power rating, to accentuate the force applied to a workpiece by a given actuator and tool geometry, and possibly even to do so without requiring a heavier structure. To this end, the invention makes use of percussion assistance for the tool.

It is of course known to apply vibration to tools, typically by means of eccentric or out of balance rotary mechanisms. Hydraulic percussion tools in themselves are also well known, for example hydraulic hammers, breakers or chisels, in which a piston is reciprocated in a cylinder, at one end of which it strikes a chisel bit. Generally, in percussion tools of this kind, the percussive force is applied directly to a workpiece or to an axially floating tool element that is in contact with the workpiece on which the tool is acting.

In this invention, the tool is manipulated directly, by an actuator connected between a direct tool-carrying member and a reference member persistently urging the one to advance relative to the other. This contrasts with known percussion chisels where an actuator essentially manipulates the percussion means, which in turn drives the tool. The percussion means is between the actuator and the tool in such known devices. In the present invention, the percussion means does not carry the tool or tool holder, but is carried by the tool holder. In this way a wide variety of tool types can be used, and the percussion means provides a supplementary route for inputting power to the system. This gives great versatility to apparatus in accordance with the invention.

The present invention concerns aspects of the apparatus described below. The scope of the invention extends to all novel aspects of the apparatus whether individually or in combination with any of the other features disclosed herein.

Accordingly, the invention can be expressed, in one of several more general forms, as relating to apparatus for performing work by advancing a tool against resistance thereto, comprising:

a tool-carrying member which is solid with the tool or at least carries the tool with no relative movement in the direction of advance of the tool;

a reference member;

an actuator operatively connected between the two members and adapted to apply and maintain a persistent force therebetween urging the tool-carrying member to advance relative to the reference member against a said resistance;

and percussion means associated with the tool-carrying member, comprising a housing positively connected to the tool-carrying member, an inertial mass movable along a reciprocating path inside the housing, and means for reciprocating the mass in the housing to periodically augment the persistent force applied by the actuator to the tool-carrying member and thereby to assist the advance of the tool relative to the reference member against the said resistance.

In important embodiments of this invention, exemplified by crushing or breaking apparatus, the members may be pivotally interconnected whereby the tool-carrying member can be pivotally advanced relative to the reference member. For example, breaking apparatus may comprise a pivotally mounted breaking jaw member and a materials support opposed thereto and spaced therefrom, whereby materials can be engaged by the jaw member upon the support, and broken thereon; and percussion means may be associated with the jaw member whereby to augment the breaking forces exerted by the pivoted jaw on the said materials. The percussion or hammer principle is thus applied to a breaking jaw mechanism to enhance and supplement the crushing action of the jaw and increase its efficiency.

The breaking apparatus is an example of apparatus for performing work by advancing a tool against resistance. The breaking jaw member is an example of a tool-carrying member, being a pivoted jaw with a hardened tip for exerting breaking pressure on concrete or the like. The working tip, as the tool, is solid with the rest of the jaw member, which carries the tool. The support member opposed to the tool forms a reference by which the advance of the tool can be measured. An actuator applies and maintains a persistent force, urging the tool-carrying member to advance towards the reference defined by the support, against the resistance of the workpiece to be broken thereon.

The actuator for advancing the tool-carrying member can be a fluid powered actuator, which is usually a hydraulic ram, but may be air powered, Especially when a substantially incompressible hydraulic fluid (ie a liquid) is used, the existing drive pressure in the fluid supply circuit, supported if desired by check valves, can have the effect of preventing backward impulses due to the reciprocating mass from retracting the actuator, while the forward impulses that advance the tool-carrying member allow more fluid to be admitted to the actuator. In this way, the actuator acts like a fluid ratchet.

The percussion means is positively mounted on the breaking jaw member. This implies a rigid or solid connection, including such rubber or other cushioned bushes or sleeves or the like as may be necessary to avoid destructive damage to the mountings, ands allows for optionally removal for maintenance or replacement. Any suitable percussion means may be employed, whether driven by fluid pressure (as is preferred), by mechanical means, by electromagnetic drive means, by the use of centrifugal or rotary impact mechanisms, with a self contained internal combustion engine, or in any other appropriate way. It will be understood that such means generally comprise a housing, an inertial mass movable along a reciprocating path inside the housing, and means for reciprocating the mass in the housing. Preferably the mass strikes a substantially fixed anvil at the impulse end of its stroke.

The percussion means may be treated as an auxiliary feature of the apparatus, only to be used when the force provided by the actuator alone is inadequate to advance the tool at a satisfactory rate. The apparatus is optionally provided with means responsive to ram fluid pressure (such as a pressure detector or a diverter valve) for initiating the reciprocation of the mass in the percussion means, to generate an automatic or semi-automatic call on the percussion means when resistance to the advance of the ram is high.

When ram progress is slow, so that the fluid demanded by the actuator is minimized, fluid power can usefully be diverted to the percussion means. Fluid remains available to advance the tool-carrying member as the resistive force is overcome.

The percussion device is suitably a modified hydraulic hammer. In these known devices, there is usually a cylinder with a piston of appreciable mass guided therein between a working end, at which the impulses are delivered to an axially floating chisel end or directly to material to be worked, and a return end. The return end of the cylinder is chargeable with a driving medium, such as compressed gas. The piston is provided with lands along its length by means of which hydraulic fluid admitted into the cylinder after the impulse stroke, at an appropriate position between seals, can return the piston to its starting position. Suitable valving arrangements ensure that on the impulse stroke, this hydraulic fluid is discharged with little or no resistance. The gas is recompressed in an accumulator between strokes by hydraulic means.

Such a device is modified for the purposes of this invention by providing an anvil, fixed to the housing for the cylinder, to receive the impulse of the piston. If the piston is of the kind that protrudes from the cylinder at the end of its stroke, the anvil may be entirely external to the cylinder. If the piston is of the kind that impacts a floating chisel or the like inside the cylinder, the chisel may be provided with a blunt end outside the cylinder, abutting or received in a stop fixed to the housing, to act as the anvil.

The invention also extends to methods of working with a tool using the principles set out herein with regard to apparatus.

Apparatus to which the invention is applicable includes:

A demolition grapple, of which at least one jaw member carries a tool typically in the form of a hardened pointed tip, while the opposite jaw member forms the reference towards which the tool is advanced;

A jack, which carries on one limb a workpiece-engaging tool, while a base or anchor of the jack forms the reference member from which the tool is advanced against the resistive weight or force of the workpiece;

An excavator or digger, in which the digger bucket is a member that carries a tool in the form of a cutting edge to be dug into resistant ground, and is pivotally mounted on the digger arm or boom, and a hydraulic actuator connected between the boom and the bucket advances the bucket, pivotally on the boom as reference member, into the ground; and A rock, concrete or engine crusher, in which the reference member is a support plate for the object to be crushed, and the tool-carrying member is a pivoted crushing plate or jaw member.

The invention is illustrated by way of example in the accompanying drawings, in which.

Figure 1:
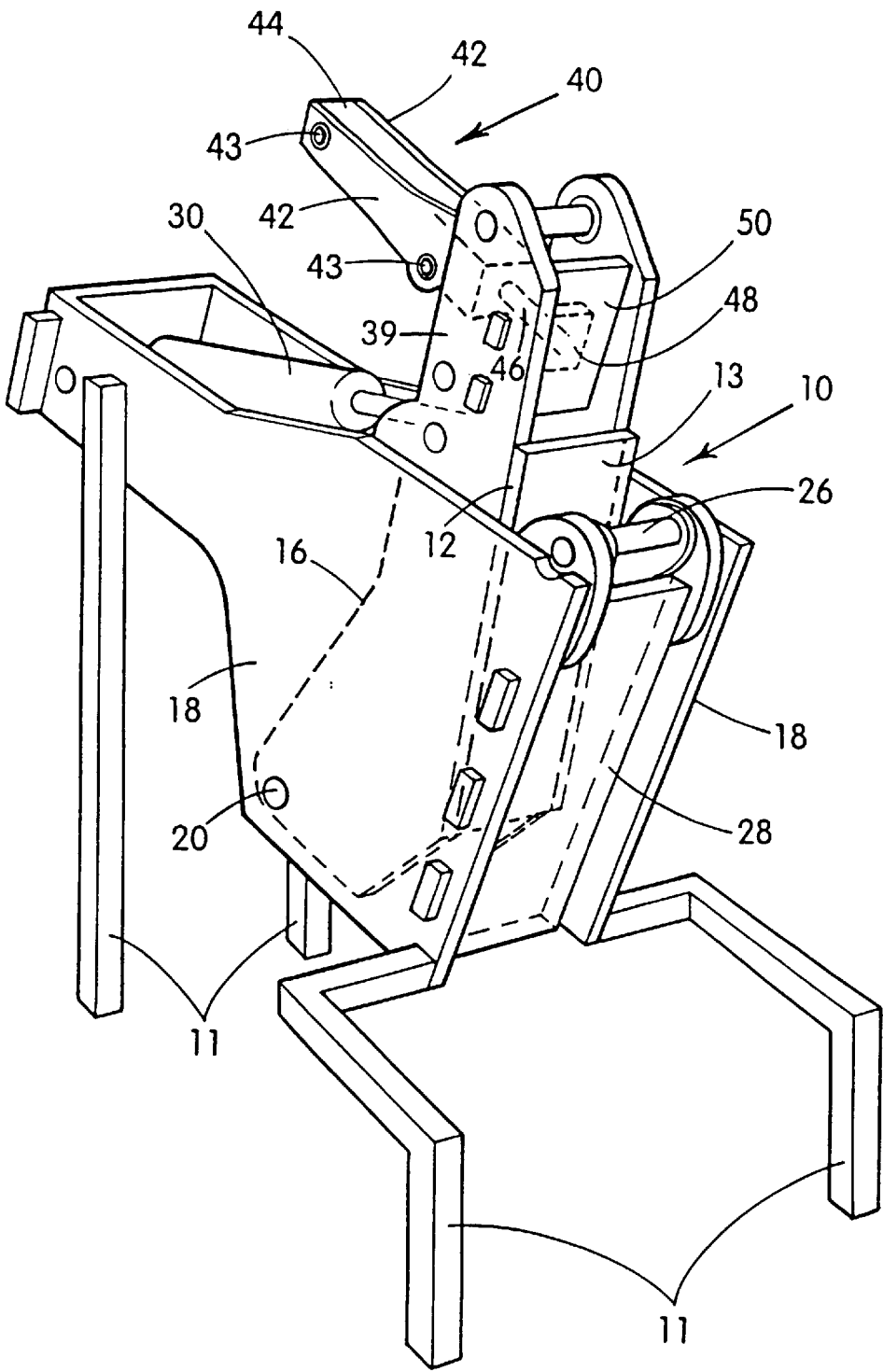
FIG. 1 is a simplified perspective view of a crusher in accordance with a first embodiment of the invention.
Figure 2:
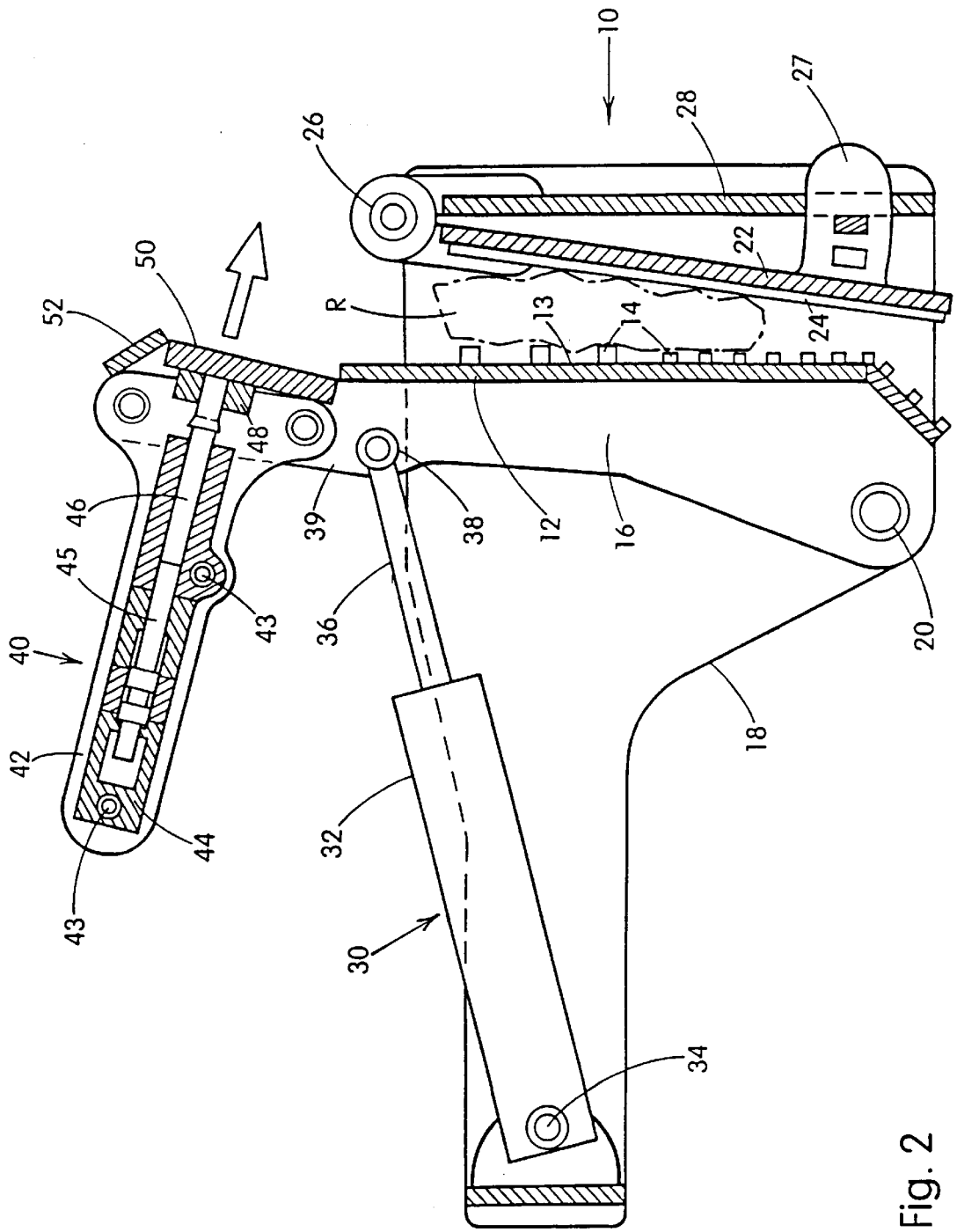
FIG. 2 is a part sectional view through the crusher of FIG. 1, showing more detail.

The rock crusher shown in FIGS. 1 and 2 of the drawings is mounted on legs 11 and consists of a primary crusher assembly 10 and a hammer assembly 40. The crusher assembly is of the same general kind as that described in my patent specification No. EP 0 106 642.

The crusher assembly 10 comprises a pivoted crusher plate 12 with a working face 13 carrying a plurality of abrasion resistant cross bars 14. The rear face of the plate 12 is reinforced by a number of stiffening webs 16. The crusher plate is carried between a pair of side plates 18 in pivot mountings 20. The working face 13 and cross bars 14 together constitute the tool, and the pivotally mounted crusher plate constitutes the tool-carrying member, in accordance with the invention.

Ahead of the crusher plate is a reaction plate 22 with a hard facing 24 on its face directed towards the crusher plate. The reaction plate is in this instance shown as pivotally mounted between the side plates 18 on pivot 26, which allows the angle of the reaction plate to be adjusted by the use of alternate fixing points in braces 27 which are carried on the back of the reaction plate and pass through the crusher assembly back plate 28 that rigidly joins the two side plates 18.

The principal features of the primary crusher assembly are completed by a double acting hydraulic actuator 30, which includes a cylinder 32 carried in mounting 34 and a piston rod 36 that is held by a pin in a bush 38 carried by crusher plate stiffening webs 16.

In use, rocks R are fed into the top of the gap between the crusher plate and the reaction plate, and the hydraulic actuator is extended to crush the rocks which, because of the angled gap between the two plates, are retained in the gap until they are reduced to dimensions that will allow them to fall through the bottom of the gap. The reaction plate held rigidly at the selected angle in the primary crusher assembly constitutes the reference member in accordance with the invention, and the actuator is operatively connected between the tool-carrying member and the reference member to advance the former relative to the latter against the resistance of the rocks to being crushed.

Certain of the crusher plate stiffening webs 16 are provided with upward extensions 39 past the top of the plate and carry, rigidly mounted thereon, percussion means in the form of hammer assembly 40.

The hammer assembly includes a hammer housing 44 mounted by rubber bushed steel pins 43 between housing mounting plates 42 that are secured to the upward extensions 39 of webs 16. Housing 44 can itself be the body of any suitable one of a variety of commercially available hydraulic hammer mechanisms that include a massive internal piston 45 reciprocated by hydraulic oil and compressed gas in a cylinder between a return end and a working or impulse end, where the piston strikes a flat ended chisel 46 as a floating anvil that projects from an end of the housing and, in typical use, has a chisel tip. Here, however, the tip is blunt and, surrounded by anvil collar 48, rests against anvil support plate 50 that is made of thick high tensile steel plate solidly welded across web extensions 39 and is capped by a bracing plate and rock deflector 52.

The hydraulic hammer unit will typically include essentially the piston moving along a reciprocating linear path between the anvil at one end and a gas cushion at the other end, driven alternately by compressed gas towards the anvil, and by pressure of hydraulic fluid on the return stroke, with the necessary hydraulic valves and a gas accumulator to drive the piston, all in response to the continuous flow of hydraulic fluid through the mechanism.

The hydraulic feed may be taken from the same pump that provides oil pressure to the actuator 30. When the actuator is being extended, fluid is supplied to one end of the cylinder, optionally through a non-return valve, and is expelled from the other end of the cylinder as the piston advances. If the resistive force encountered by the piston rod rises above a certain level, which may occur if particularly hard rocks are encountered, the fluid supply pressure correspondingly increases, as the piston fails to advance at the same rate. If the fluid supply pressure exceeds a predetermined value, a simple relief valve opens, or a more elaborately a pressure operated valve causes oil to start flowing to the hydraulic hammer while maintaining the pressure in the actuator. The action of the inertial mass of the piston reciprocating in the hammer housing against the anvil adds a periodic impulse to the force exerted on the rocks by the actuator. The effects of the reverse impulses of the piston are much less severe than the forward impacts, being spread over time. The resultant reverse forces are resisted by the pressure of the fluid still being fed to the actuator 30 by the hydraulic supply pump, and optionally also resisted by a check valve in the supply line.

When the resistive force is overcome, the actuator piston moves forward and the supply pressure may fall to a value at which fluid is no longer delivered to the hammer.

On retraction of the actuator, provision is of course made in the normal way for the necessary fluid drainage from the cylinder as the hydraulic oil flow is reversed.

Figure 3:
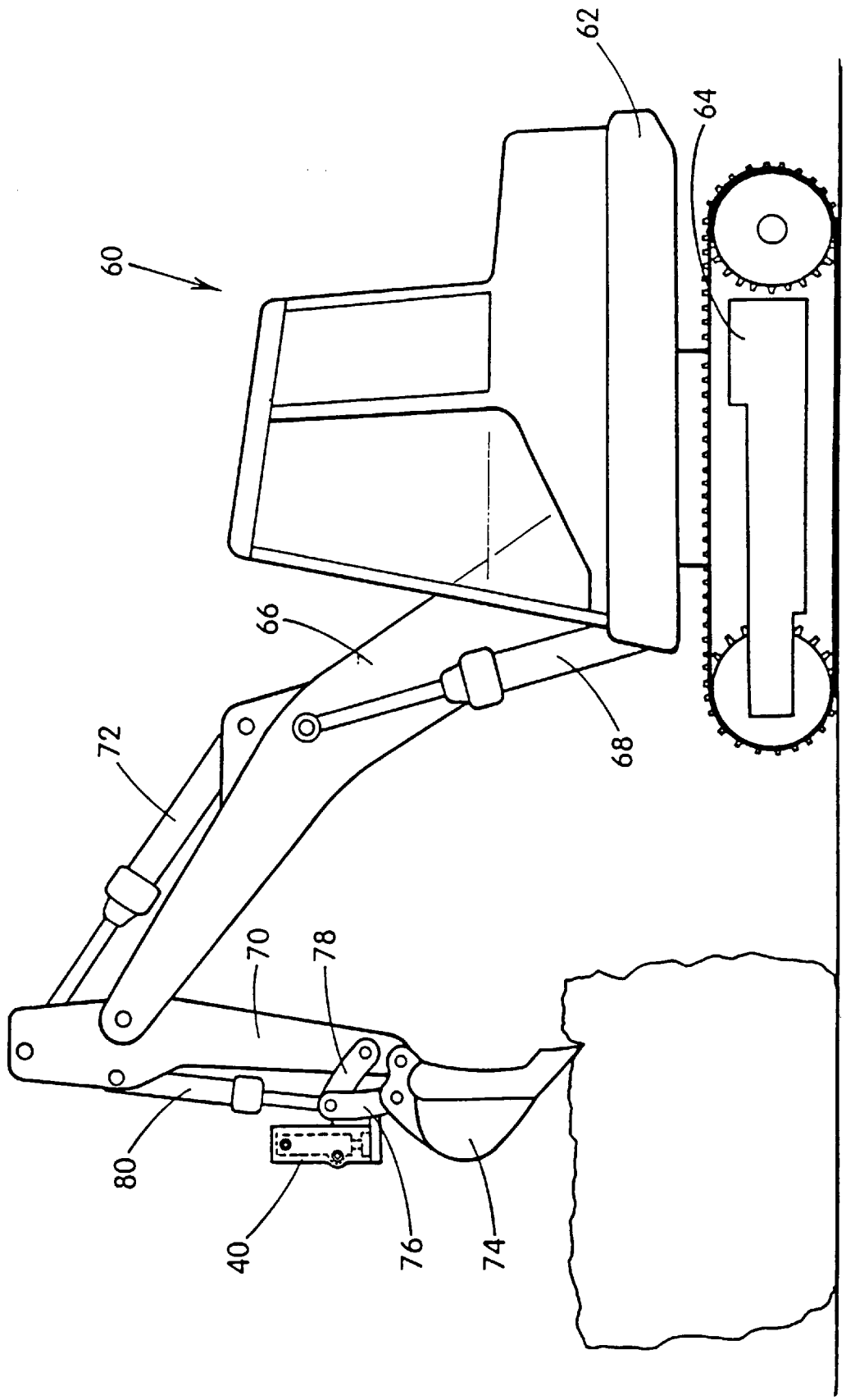
FIG. 3 is a side elevation of a second embodiment of the invention, showing an excavator carrying a percussion assisted bucket.
Figure 4:
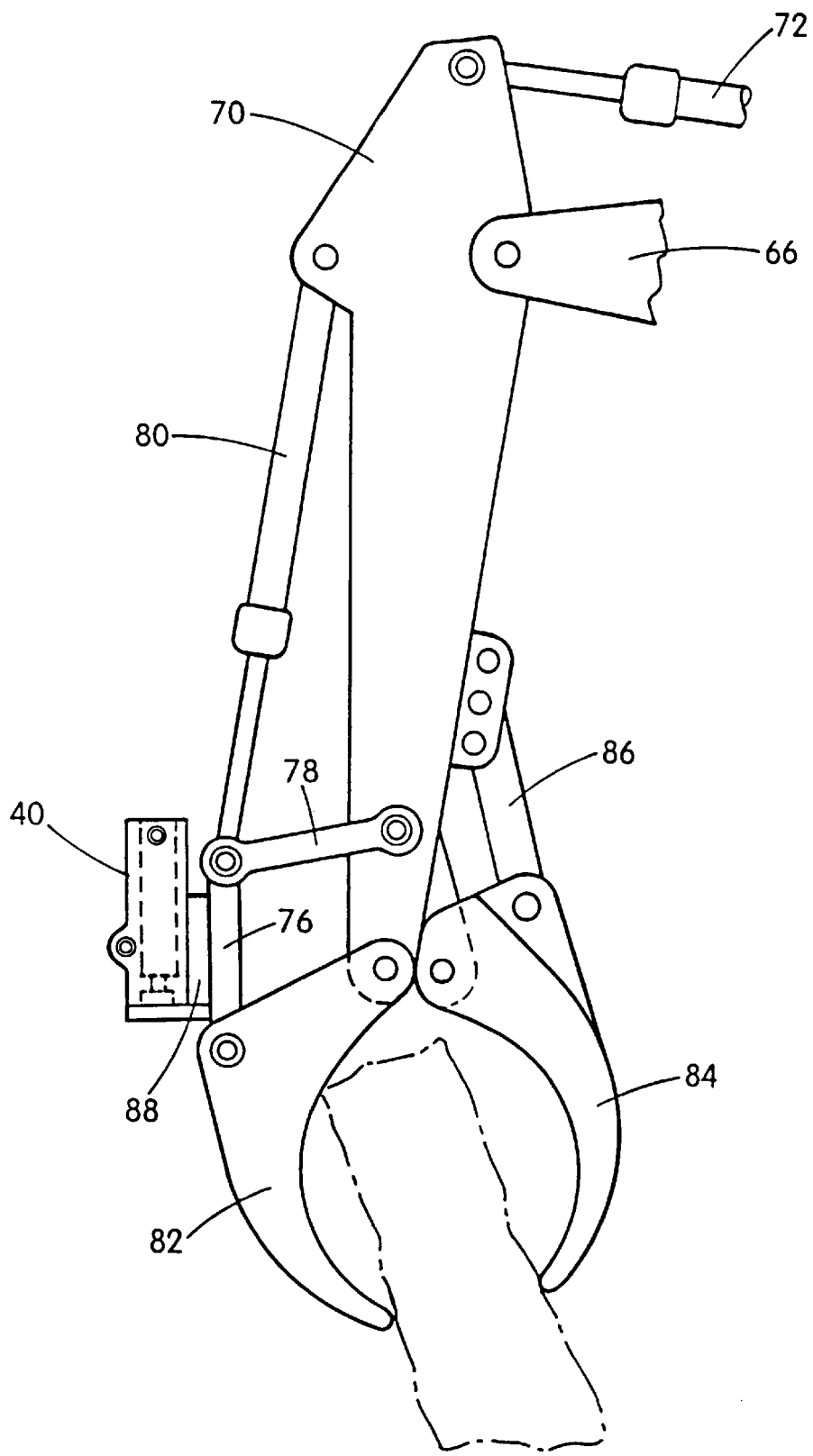
FIG. 4 is a detail of an excavator arm carrying a different attachment in accordance with a further embodiment of the invention, namely a percussion assisted demolition grapple.
Figure 5:
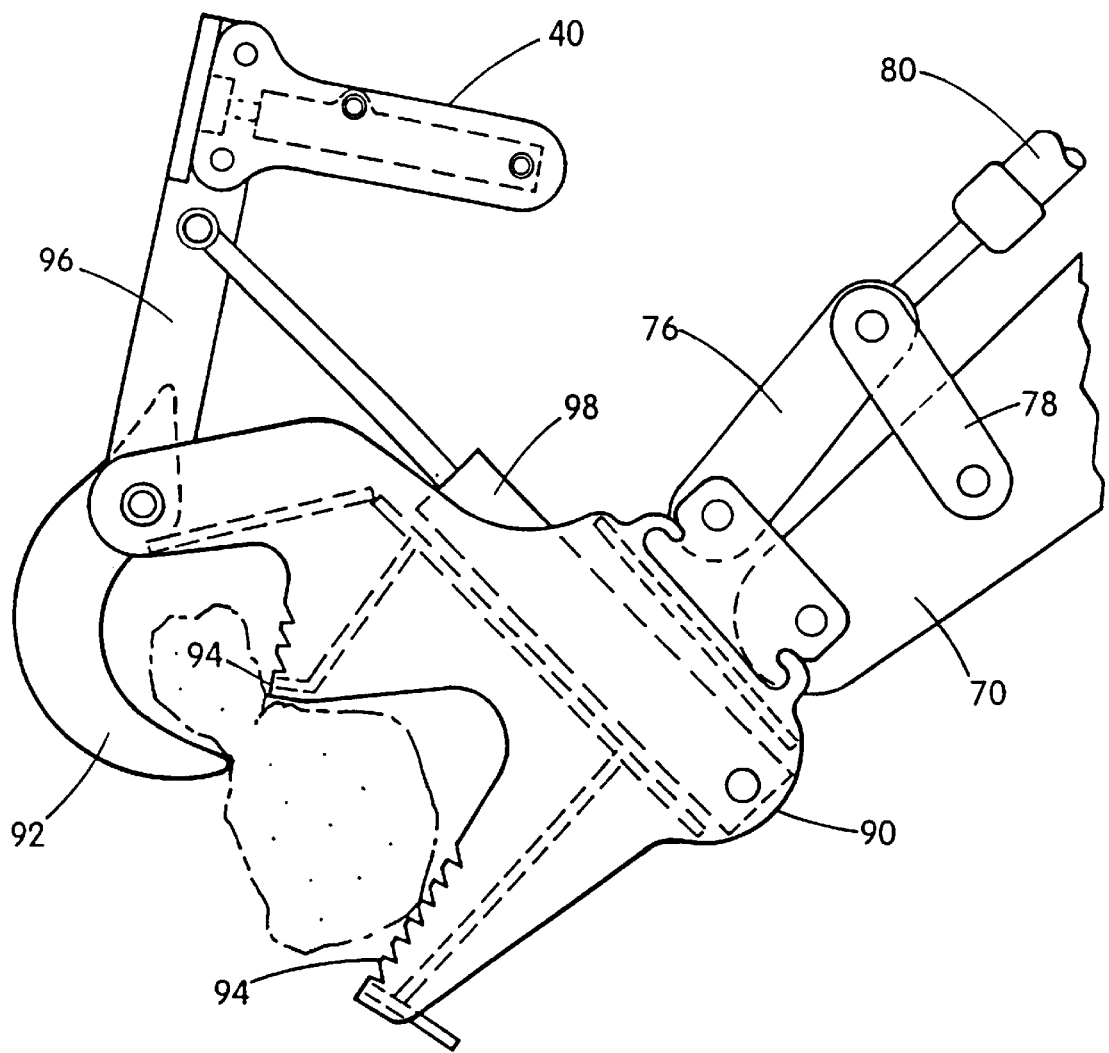
FIG. 5 illustrates a further embodiment of the invention, namely a percussion assisted rock crusher, mounted on an excavator arm.

FIGS. 3, 4 and 5 illustrate the invention applied to attachments for excavators, and the same principles apply equally to loading shovels, backhoes and the like. In these Figures, essentially similar parts are given the same reference numerals.

In FIG. 3 an excavator 60 has a body 62 which can slew horizontally, around a vertical axis, above a drive chassis 64. A primary arm 66 is pivotally mounted on body 62 for vertical motion, which is controlled and driven by a hydraulic ram 68 acting between the body and the primary arm. A secondary arm 70 is pivotally mounted at the distal end of the primary arm for motion in a vertical plane, driven and controlled by a hydraulic ram 72 acting between the primary and secondary arms. A digger bucket 74 is pivotally mounted for vertical motion at the distal end of the secondary arm, driven and controlled by a hydraulic ram 80 acting between the secondary arm and the bucket to which it is connected in the conventional manner by a crowd link 76 supported by a stabilizer link 78.

Hydraulic hammer unit 40 is welded to crowd link 76, or may be included within th e link, substantially parallel to it, and accordingly always acts in a direction parallel to the link. This means that when ram 80 is being extended to crowd or advance the bucket, the hammer unit always acts in the proper direction to assist that advance. It also means that the hammer unit can be used to assist other rams: for example, to assist the articulation of the secondary arm on the primary arm, by ram 72, the bucket can be crowded until the hammer 40 is at about 90° to the pivot mounting for the secondary arm.

In FIG. 4, the attachment on secondary arm 70 is a demolition grapple with a pivoted jaw member 82 movable by ram 80 towards and away from adjustable jaw member 84, which is braced by stay bar 86.

FIG. 4 shows more clearly the simple welded mounting 88 for the hammer unit 40 on crowd link 76. However, the hammer unit 40 can be carried directly on the attachment, as shown in FIG. 5.

In FIG. 5, the attachment is a rock crusher or concrete breaker with a body 90 pivotally mounted on the distal end of secondary arm 70. A breaking jaw member 92 is pivotally mounted on the body in opposition to two support platforms 94 against which concrete and the like can be split or crushed by the jaw 92, when lever arm 96, which is a solid extension of the jaw, is driven by ram 98 carried by the attachment.

Hammer mechanism 40 is carried directly on lever arm 96, at about right angles to the pivot mounting of jaw 92, so that it can act at all times in the appropriate direction to assist the advance of the jaw towards support platforms 94, under the urging of ram 98.

Figure 6:
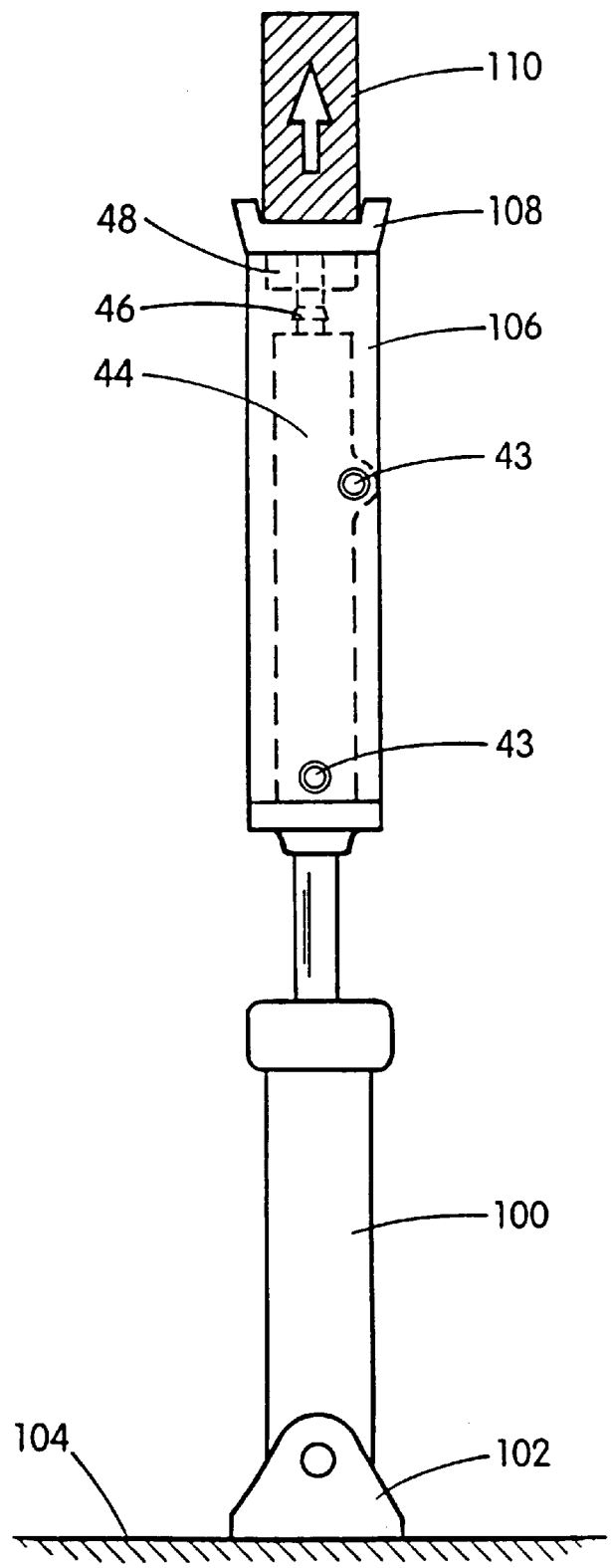
FIG. 6 is an elevation illustrating another embodiment of the invention, namely a percussion assisted hydraulic jack.

FIG. 6 shows a hydraulic jack comprising a ram 100 mounted on a pivot base 102 standing on solid ground or another support 104. The piston end of the ram carries a rigid round or box section tube 106 in which hammer mechanism housing 44 is rigidly mounted by the usual pins 43 in cushioned bushes. A workpiece-engaging tool 108, such as a cup, engaging workpiece (load) 110 is welded to the top end of tube 106. The lower face of the tool acts as a stop for the floating anvil 46,.which is again surrounded, supported and held by anvil collar 48. In effect, the hammer mechanism is an active component within an extension to the piston rod of the ram. Such an arrangement can also be used in the actuators in other embodiments of the invention.

Figure 7:
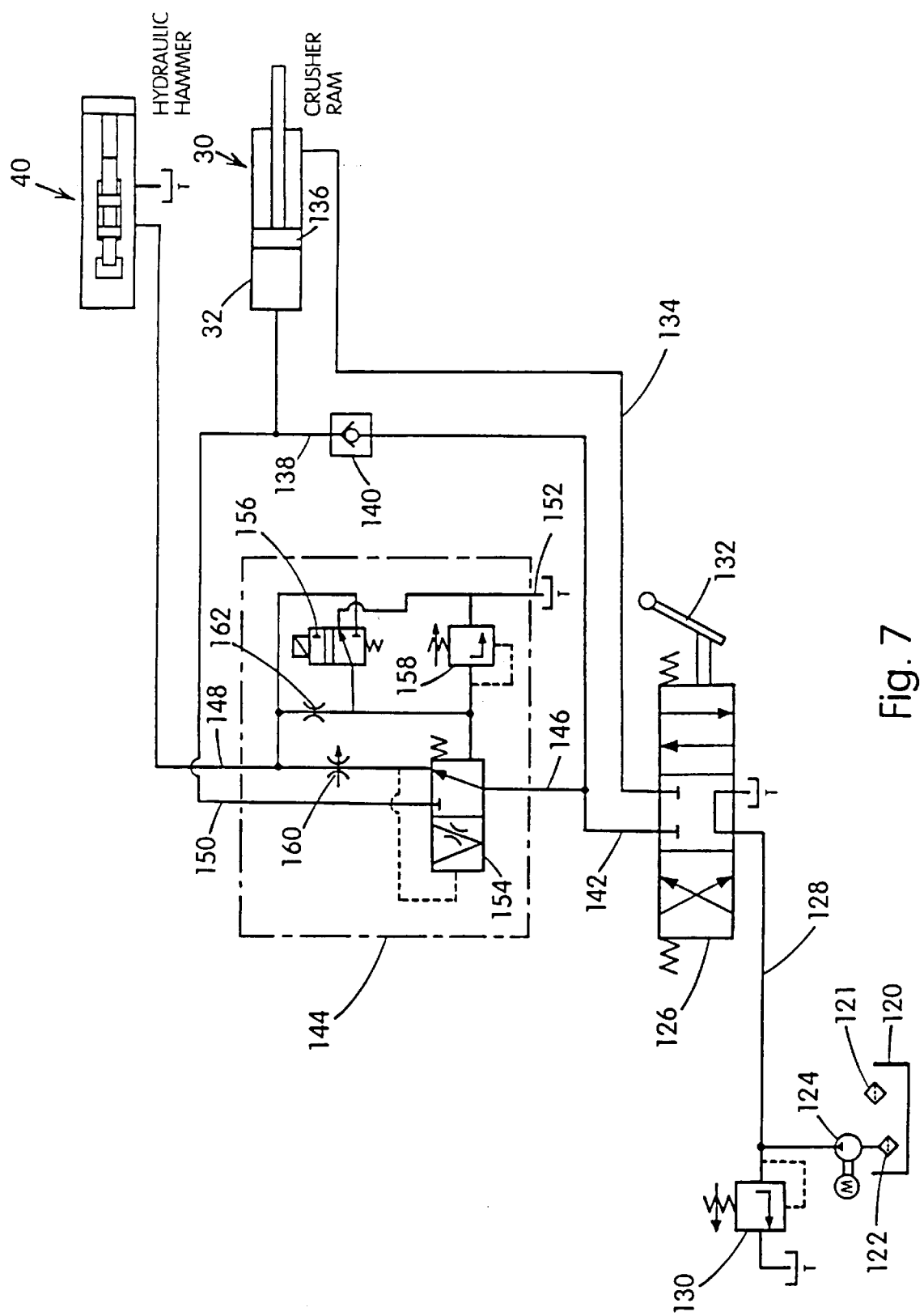
FIG. 7 is a diagram of a hydraulic circuit suitable for use with the invention.

FIG. 7 shows a hydraulic circuit in outline form suitable for the crusher of FIGS. 1 and 2. Hydraulic oil is taken from tank 120 through filter 122 by pump 124, and fed to spool valve 126. The feed line 128 includes an adjustable pressure relief valve 130. The tank is kept supplied by return oil lines (not shown) through return line filter 121.

In its spring biased neutral position, as shown, valve 126 returns the oil to tank. The valve can however be operated by lever 132, or remotely by a solenoid control, to two different working positions.

When the spool is to the right, oil passes into line 134 and withdraws the piston 136 of crusher ram 30 into its cylinder 32, expelling oil from the other end of the cylinder into line 138, which leads the oil through check valve 140 back to valve 126 and thence to tank.

In this condition, then, the crusher jaws are being opened and the hammer mechanism is not required.

The second working condition, with the spool to the left, corresponds to the crushing operation, in which the ram 30 is used until resistance requires the hammer mechanism 40 to be brought into play.

In this condition, line 134 is connected to tank, allowing piston 136 in ram 30 to advance when sufficiently powered.

To this end, hydraulic fluid is admitted by valve 126 to line 142, but since it cannot pass check valve 140, it flows into flow regulator 144, which has a single inlet 146, a priority outlet 148, a by-pass outlet 150, and a drain outlet 152.

Flow regulator 144 includes a flow splitter valve 154, a normally open solenoid operated valve 156, and an adjustable relief valve 158, as well as a variable flow control valve 160.

The valves in regulator 144 are all shown in their start-up condition. Oil initially flows up to control valve 160, which causes a pressure build-up sufficient to switch the spool of valve 154 to the right. Oil then continues to flow restrictedly through valve 154 into and through variable restrictor valve 160, through further flow restrictor 162, and through solenoid valve 156 to tank via outlet 152. However, this drain flow is very small, and most of the oil exits flow regulator through by-pass outlet 150, to power crusher ram 30.

Solenoid valve 156 can be energised manually, but also by sensing the oil pressure in line 138 rising above a threshold that corresponds to impaired progress of ram 30. In either case, the valve switches to close the oil flow to outlet 152, opening instead a by-pass path around flow restrictor 162, and allowing a pressure build-up to the right of valve 154 which shifts its spool to the position shown in FIG. 7. Relief valve 158 exists principally as a safety measure.

This now cuts off the by-pass flow to the crusher ram, but line 138 remains pressurised due to the continuing oil input into line 142, keeping check valve 140 closed. Accordingly, oil flows in quantity through priority outlet 140, to hydraulic hammer 40, activating it. The oil then returns to tank.

Once the priority flow is established the surplus flow diverted to the by-pass outlet. The relative flows can be varied by adjusting valve 160, because the flow restriction here controls the pilot pressure to the left of valve 154.

Accordingly, the spool of valve 154 shuttles back and forth, dividing the oil flow between the priority outlet to the hammer and the bypass outlet to the crusher ram, which can advance as the percussion of the hammer mechanism overcomes the resistance of the rock R (FIG. 2) in the crusher jaws.

When the ram advances, solenoid valve 156 can be de-energised, either manually or automatically upon sensing the advance of the ram by a suitable pressure or other transducer. The hammer then ceases operation, because the small oil flow towards the hammer through valve 154 all drains to tank through the solenoid valve.

I claim:

1. Apparatus for performing work by advancing a tool against resistance thereto, comprising a tool-carrying member which is solid with the tool or at least carries the tool with no relative movement in the direction of advance of the tool;

a reference member;

an actuator operatively connected between the two members and adapted to apply and maintain a persistent force therebetween urging the tool-carrying member to advance relative to the reference member against said resistance;

and percussion means associated with the tool-carrying member, comprising a housing positively connected to the tool-carrying member, an inertial mass movable along a reciprocating path inside the housing, and means for reciprocating the mass along the path in the housing to periodically augment the persistent force applied by the actuator to the tool-carrying member by periodic percussive impact forces applied by the reciprocating mass against one end of the path and transmitted to the tool-carrying member and thereby to assist the advance of the tool relative to the reference member against said resistance.

2. Apparatus according to claim 1 wherein the tool carrying member and the reference member are pivotally interconnected whereby the tool carrying member can be pivotally advanced relative to the reference member.

3. Apparatus according to claim 1 wherein the tool carrying member comprises a pivotally mounted breaking jaw member and the reference member comprises a materials support opposed thereto and spaced therefrom, whereby materials can be engaged by the jaw member upon the support, and broken thereon; and percussion means associated with the jaw member whereby to augment the breaking forces exerted by the pivoted jaw on said materials.

4. Apparatus according to claim 1 wherein the actuator for advancing the tool carrying member is a hydraulic actuator utilizing a substantially incompressible hydraulic fluid, comprising means for preventing backward impulses due to the reciprocating mass from retracting the actuator, while allowing more fluid to be admitted to the actuator when forward impulses due to the reciprocating mass advance the tool carrying member.

5. Apparatus according to claim 1 wherein the reciprocating mass strikes a substantially fixed anvil at an impulse end of its stroke.

6. Apparatus according to claim 1 wherein the actuator and the percussion means are both fluid driven, including means for diverting fluid power from the actuator to the percussion means when the advance of the tool against the resistance is relatively slow.

7. Apparatus according to claim 6 comprising means responsive to fluid pressure in the actuator for initiating the reciprocation of the mass in the percussion means.

8. An excavator attachment comprising apparatus for performing work by advancing a tool against resistance thereto, comprising a tool-carrying member which is solid with the tool or at least carries the tool with no relative movement in the direction of advance of the tool;

a reference member; an actuator operatively connected between the two members and adapted to apply and maintain a persistent force therebetween urging the tool-carrying member to advance relative to the reference member against said resistance;

and percussion means associated with the tool-carrying member, comprising a housing positively connected to the tool-carrying member, an inertial mass movable along a reciprocating path inside the housing, and means for reciprocating the mass along the path in the housing to periodically augment the persistent force applied by the actuator to the tool-carrying member by periodic percussive impact forces applied by the reciprocating mass against one end of the path and transmitted to the tool-carrying member and thereby to assist the advance of the tool relative to the reference member against said resistance and means for attaching said apparatus to an articulated arm of an excavator.

9. A rock, concrete or engine crusher, comprising apparatus for performing work by advancing a tool against resistance thereto, comprising a tool-carrying member which is solid with the tool or at least carries the tool with no relative movement in the direction of advance of the tool;

a reference member; an actuator operatively connected between the two members and adapted to apply and maintain a persistent force therebetween urging the tool-carrying member to advance relative to the reference member against said resistance;

and percussion means associated with the tool-carrying member, comprising a housing positively connected to the tool-carrying member, an inertial mass movable along a reciprocating path inside the housing, and means for reciprocating the mass along the path in the housing to periodically augment the persistent force applied by the actuator to the tool-carrying member by periodic percussive impact forces applied by the reciprocating mass against one end of the path and transmitted to the tool-carrying member and thereby to assist the advance of the tool relative to the reference member against said resistance, in which the reference member is a support plate for an object to be crushed, and the tool carrying member is a pivoted crushing plate or jaw member.

10. A method of performing work by advancing a tool against resistance thereto, comprising applying and maintaining a persistent force between a tool carrying member and a reference member in an apparatus comprising a tool-carrying member which is solid with the tool or at least carries the tool with no relative movement in a direction of the advance of the tool;

a reference member;

an actuator operatively connected between the two members and adapted to apply and maintain a persistent force therebetween urging the tool-carrying member to advance relative to the reference member against said resistance;

and percussion means associated with the tool-carrying member, comprising a housing positively connected to the tool carrying member, an inertial mass movable along a reciprocating path inside the housing, and means for reciprocating the mass along the path in the housing and reciprocating the inertial mass along the path in the housing to periodically augment the persistent force applied by the actuator to the tool-carrying member by periodic percussive impact forces applied by the reciprocating mass against one end of the path and transmitted to the tool-carrying member and thereby to assist the advance of the tool relative to the reference member against said resistance.

11. Apparatus for performing work by advancing a tool against resistance thereto, comprising a tool-carrying member which is solid with the tool or at least carries the tool with no relative movement in the direction of advance of the tool;

a reference member;

an actuator operatively connected between the two members and adapted to apply and maintain a persistent force therebetween urging the tool-carrying member to advance relative to the reference member against said resistance;

and percussion means associated with the tool-carrying member, comprising a housing positively connected to the tool-carrying member, an inertial mass movable along a reciprocating path inside the housing, and means for reciprocating the mass along the path in the housing into periodic striking engagement with an anvil having a member solid with the tool carrying member thereby to assist the advance of the tool relative to the reference member against said resistance.

12. Apparatus according to claim 11 wherein the anvil includes a blunt ended chisel mounted on the path for transmitting impact by the inertial mass to the member of the anvil which is solid with the tool carrying member.

13. Apparatus for performing work by advancing a tool against resistance thereto, comprising a tool-carrying member which is solid with the tool or at least carries the tool with no relative movement in the direction of advance of the tool;

a reference member;

an actuator operatively connected between the two members and adapted to apply and maintain a persistent force therebetween urging the tool-carrying member to advance relative to the reference member against said resistance;

and percussion means associated with the tool-carrying member, comprising a housing positively connected to the tool-carrying member, an inertial mass movable along a reciprocating path inside the housing, and means for reciprocating the mass in the housing to periodically augment the persistent force applied by the actuator to the tool-carrying member and thereby to assist the advance of the tool relative to the reference member against said resistance;

wherein the actuator for advancing the tool carrying member is a hydraulic actuator utilizing a substantially incompressible hydraulic fluid, comprising means for preventing backward impulses due to the reciprocating mass from retracting the actuator, while allowing more fluid to be admitted to the actuator when forward impulses due to the reciprocating mass advance the tool carrying member.

* * * * *